H. S. GREENE.
LUBRICATING MEANS.
APPLICATION FILED NOV. 9, 1908.

918,312.

Patented Apr. 13, 1909.

Witnesses

Inventor
Harry S. Greene
by James Shuhy
Attorney

UNITED STATES PATENT OFFICE.

HARRY S. GREENE, OF WOONSOCKET, RHODE ISLAND.

LUBRICATING MEANS.

No. 918,312.  Specification of Letters Patent.  Patented April 13, 1909.

Application filed November 9, 1908. Serial No. 461,695.

*To all whom it may concern:*

Be it known that I, HARRY S. GREENE, a citizen of the United States, residing at Woonsocket, in the county of Providence and State of Rhode Island, have invented new and useful Improvements in Lubricating Means, of which the following is a specification.

My present invention has to do with lubrication, and contemplates the provision of simple and inexpensive means for lubricating a plurality of journals, bearing in and grouped about the center of movement of a rotary carrier and adapted to be turned in their bearings incidental to the rotation of the carrier; the said means being calculated to assure the supply of an adequate quantity of lubricant to the journals when the rotary carrier and the journals are in motion and to stop such supply and prevent waste of lubricant when the rotary carrier and the journals are at rest.

Figure 1:
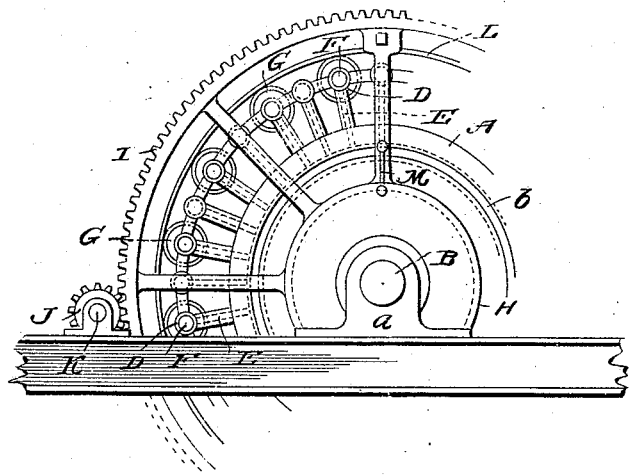
Figure 2:
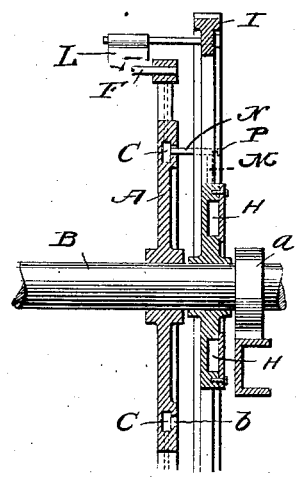
Figure 3:
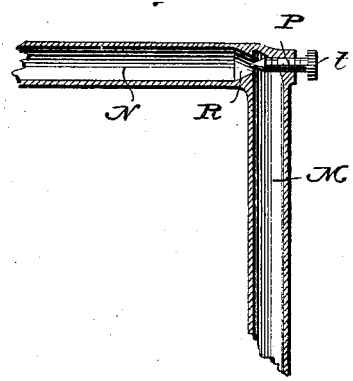

With the foregoing in mind, the invention will be fully understood from the following description and claims when the same are read in connection with the drawings, accompanying and forming part of this specification, in which:

Figure 1 is a view of so much of the journals, the rotary carrier in which the same bear, and the lubricating means, as is necessary to illustrate a practical embodiment of my invention. Fig. 2 is a diametrical section of the same. Fig. 3 is an enlarged, detail section, illustrating a practical means for permitting the passage of lubricant under centrifugal action and for preventing such passage and waste of lubricant when the rotary lubricant reservoir is at rest.

Similar letters designate corresponding parts in all of the views of the drawings, referring to which:

A is a rotary carrier, supported by preference on a shaft B to which it is fixed and through the medium of which it is rotated; the said shaft being journaled in a suitable fixed bearing $a$. The rotary carrier A is provided with an annular chamber C, open at one side as indicated by $b$, and it is also provided with a plurality of journal bearings D grouped about its center of movement, and a plurality of ducts E extending between and connecting the chamber C and the bearings D so as to conduct lubricant from the former to the latter. In the bearings D of the rotary carrier journals F are arranged; the said journals being fixed with respect to rollers G, as clearly shown in Fig. 1.

H is a rotary lubricant reservoir which is designed to be rotated incidental to the rotation of the carrier A and preferably in an opposite direction to that in which the carrier is turned. The said reservoir H is preferably, though not necessarily, of the circular form illustrated, and without involving departure from the scope of my claimed invention it might be driven by the direct application of a belt or any other driving connection thereto. It will be noted, however, that in the present and preferred embodiment of my invention, the reservoir H, which is loosely mounted on and supported by the shaft B is fixed with respect to a large spur gear I which is arranged to derive motion from a pinion J fixed on a shaft K. Connected with the spur gear I and movable by the same in a direction opposite to that in which the carrier A is designed to be rotated is a band L which has for its office to engage the rollers G and turn the same about their axes during the rotation of the carrier A and the gear I.

Communicating with and leading radially from the lubricant reservoir H is a lubricant conduit M, provided with a lateral arm N which extends to a point within the chamber C in the rotary carrier A, as best shown in Fig. 2. The said conduit M is also provided with means for restricting the size of the passage therethrough with a view of enabling lubricant of proper consistency to pass to the chamber C when such lubricant is subject to centrifugal action but not when the centrifugal force is absent, and this latter even when the conduit M at such time extends downwardly. The said means is preferably in the form of a needle valve P which is threaded into the conduit M and is designed to coöperate with a contracted passage R intermediate the conduit M and the lateral arm N thereof. When desired the needle valve may have a roughened finger-piece $t$ at its outer end as shown.

In the practical use of my improvements the carrier A and the gear I and reservoir H are rotated, when, as will be readily understood, lubricant will be forced by centrifugal action from the reservoir H through the conduit M and the arm N thereof into the annular chamber C in the carrier A from whence it will pass through the ducts E to the bearings of the journals F to assure the thorough lubrication of the latter. When, however, the needle valve P is in the position to permit the passage of lubricant when the latter is forced by centrifugal action and to prevent such passage when the centrifugal action is absent, as is the case while the gear I and reservoir H are at rest, lubricant will not be supplied to the chamber C in the carrier A, and hence waste of lubricant and the dripping of excess lubricant from the piece of machinery will be obviated, which is an important advantage in lubricating means analogous to that forming the subject matter of this application.

It will be gathered from the foregoing that my novel lubricating means is adapted to be used to advantage in any machine that comprises a rotary carrier having a plurality of journal bearings grouped about its center; the purpose to which the machine is to be put being immaterial since it has nothing to do with my invention.

In addition to the practical advantages hereinbefore ascribed to my improved lubricating means, it will be manifest that the said means is simple, compact, and durable, and that its installation increases but little the cost of producing the carrier A and the means for rotating the rollers G incidental to rotation of the carrier.

Having described my invention, what I claim and desire to secure by Letters-Patent, is:

1. The combination in lubricating means, of a suitably supported rotary carrier having a laterally-open annular chamber and also having a plurality of journal bearings grouped about the annular chamber and ducts connecting the annular chamber and the journal bearings, a suitably supported rotary lubricant reservoir, and a conduit leading from said reservoir and arranged to discharge into the chamber in the carrier.

2. The combination in lubricating means, of a suitably supported rotary carrier having a laterally-open annular chamber and also having a plurality of journal bearings grouped about the annular chamber and ducts connecting the annular chamber and the journal bearings, a suitably supported rotary lubricant reservoir, a conduit leading from said reservoir and arranged to discharge into the annular chamber of the carrier, and means in said conduit for restricting the passage therethrough.

3. The combination in lubricating means, of a suitably supported rotary carrier having a laterally-open annular chamber and also having a plurality of journal bearings grouped about the annular chamber and ducts connecting the annular chamber and the journal bearings, a suitably supported rotary lubricant reservoir, a conduit leading from said reservoir arranged to discharge into the annular chamber of the carrier, means in said conduit for restricting the passage therethrough, journals disposed in the bearings of the carrier, means for rotating the carrier, means for rotating the journals incidental to rotation of the carrier, and means for rotating the reservoir incidental to rotation of the carrier.

In testimony whereof I have hereunto set my hand in presence of two subscribing witnesses.

HARRY S. GREENE.

Witnesses:
EDGAR L. SPAULDING,
FRANCES L. COYLE.